United States Patent
Han

(10) Patent No.: US 10,570,800 B2
(45) Date of Patent: Feb. 25, 2020

(54) EXHAUST SYSTEM HAVING DIFFERENTIAL PRESSURE SENSOR

(71) Applicant: Hyundai Motor Company, Seoul (KR)

(72) Inventor: Sang Bong Han, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 15/377,417

(22) Filed: Dec. 13, 2016

(65) Prior Publication Data

US 2018/0112581 A1 Apr. 26, 2018

(30) Foreign Application Priority Data

Oct. 20, 2016 (KR) .................. 10-2016-0136735

(51) Int. Cl.
*F01N 11/00* (2006.01)
*F01N 3/021* (2006.01)
*F01N 13/00* (2010.01)
*F01N 13/08* (2010.01)

(52) U.S. Cl.
CPC ............ *F01N 11/002* (2013.01); *F01N 3/021* (2013.01); *F01N 13/008* (2013.01); *F01N 13/08* (2013.01); *F01N 2550/04* (2013.01); *F01N 2560/08* (2013.01); *F01N 2900/1406* (2013.01); *Y02T 10/20* (2013.01); *Y02T 10/47* (2013.01)

(58) Field of Classification Search
CPC .............. F01N 11/002; F01N 2340/06; F01N 2560/08; F01N 3/021; G01L 13/00
See application file for complete search history.

(56) References Cited

U.S. PATENT DOCUMENTS

| 2005/0188686 | A1 | 9/2005 | Saito et al. |
| 2006/0005627 | A1* | 1/2006 | Nomura ............... G01L 19/0038 73/716 |
| 2015/0047348 | A1* | 2/2015 | Osumi .................... F01N 3/103 60/605.2 |
| 2015/0128576 | A1* | 5/2015 | Osumi .................... F01N 3/035 60/287 |

FOREIGN PATENT DOCUMENTS

| CN | 102112711 A | 6/2011 | |
| CN | 102787895 A | 11/2012 | |
| CN | 104285049 A | 1/2015 | |
| CN | 104879206 A | 9/2015 | |
| JP | 2005-042664 A | 2/2005 | |
| KR | 10-2008-0047047 A | 5/2008 | |
| KR | 10-2011-0026015 A | 3/2011 | |
| WO | WO-2016035903 A1 * | 3/2016 | ............. F01N 13/08 |

* cited by examiner

*Primary Examiner* — Ngoc T Nguyen

(74) *Attorney, Agent, or Firm* — Morgan, Lewis & Bockius LLP

(57) ABSTRACT

An exhaust system having a differential pressure sensor may include an intake pipe that houses fresh air from the outside to supply the fresh air to a turbocharger; an exhaust pipe that supplies an EGR gas, having passed through a Diesel Particulate Filter (DPF) to upstream of the turbocharger to mix with the fresh air; and a differential pressure sensor that measures a pressure difference between the front end portion and the rear end portion of the DPF, wherein the differential pressure sensor is directly mounted in the exhaust pipe that is disposed at the rear end portion of the DPF.

11 Claims, 4 Drawing Sheets

EXHAUST SYSTEM HAVING DIFFERENTIAL PRESSURE SENSOR

CROSS-REFERENCE TO RELATED APPLICATION

The present application claims priority to Korean Patent Application No 10-2016-0136735 filed on Oct. 20, 2016, the entire contents of which is incorporated herein for all purposes by this reference.

BACKGROUND OF THE INVENTION

Field of the Invention

The present invention relates to an exhaust system having a differential pressure sensor. More particularly, the present invention relates to relates to an exhaust system having a differential pressure sensor that measures a pressure difference before and after treatment of an exhaust gas aftertreatment apparatus.

Description of Related Art

All countries of the world including Europe have been performed an environment policy that is related to an exhaust gas. In order to correspond to various regulations according to such an environment policy, in a vehicle having a diesel engine, a Diesel Particulate Filter (DPF) for reducing an exhaust gas is installed. The DPF collects a smoke material among an exhaust gas, and when a predetermined amount or more of smoke material is deposited, the DPF increases an exhaust temperature to burn the deposited smoke material, thereby removing the exhaust gas.

In a diesel engine vehicle, an Exhaust Gas Recirculation (EGR) apparatus that recirculates an exhaust gas is applied, and the EGR apparatus is generally provided together with an exhaust system having the DPF.

Nowadays, in order to implement a high engine performance operating in a high load area, the EGR apparatus that is applied to a diesel vehicle additionally requires a Low-Pressure EGR in addition to a High-Pressure EGR.

The LP-EGR uses a method of injecting an EGR into the front end of a turbocharger that is provided at upstream further than an intake manifold and reinforces a High-Pressure EGR that directly injects an EGR into the intake manifold.

In order to detect a smoke material of the LP-EGR, a differential pressure sensor is applied. A DPF of the LP-EGR may be reproduced according to a differential pressure that is detected by the differential pressure sensor and a driving condition of an engine.

FIG. 4 is a schematic diagram of a conventional differential pressure sensor and an exhaust system to which the differential pressure sensor is applied.

Referring to FIG. 4, a conventional exhaust system includes an engine 10, a DPF 20 that is provided at downstream of the engine 10, and a differential pressure sensor 30 that measures a pressure of the front end and the rear end of the DPF 20. That is, an exhaust gas that is discharged from the engine 10 passes through the DPF 20, and in this case, the differential pressure sensor 30 measures a pressure of an exhaust gas that is discharged from the engine 10 through a pair of hoses 31 and 33 that are connected with the front end and the rear end of the DPF 20 and a pressure of an exhaust gas that passes through the DPF 20 to calculate a differential pressure value thereof.

However, a high temperature of exhaust gas or condensate water may be injected into the differential pressure sensor 30 through such a configuration and a pair of hoses 31 and 33 that are installed at the front end and the rear end of the DPF 20. Therefore, as shown in FIG. 4, a position of the differential pressure sensor 30 should be spaced apart a predetermined gap from an upper portion of a vertical direction of the engine 10 and the DPF 20, and in this case, in order to stably measure a pressure, the pair of hoses 31 and 33 should always be in a state A1 facing upward. When an intermediate portion of the pair of hoses 31 and 33 is in a state A2 that is bent downward, condensate water is stagnated in the bent portion 41 and thus it is difficult to preciously measure a pressure and the differential pressure sensor 30 may be polluted.

In this way, in order to prevent the conventional differential pressure sensor 30 from being polluted or to prevent heat damage from occurring in the conventional differential pressure sensor 30, a limitation in disposition thereof may exist and a pair of hoses 31 and 33 should be installed at the front end and the rear end of the DPF 20 and thus there is a problem that a cost increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a differential pressure sensor having a structure in which the rear end portion of a DPF and the differential pressure sensor are directly engaged and an exhaust system having the same.

Various aspects of the present invention are directed to providing an exhaust system having a differential pressure sensor including: an intake pipe that houses fresh air from the outside to supply the fresh air to a turbocharger; an exhaust pipe that supplies an EGR gas, having passed through a Diesel Particulate Filter (DPF) to upstream of the turbocharger to mix with the fresh air; and a differential pressure sensor that measures a pressure difference between the front end portion and the rear end portion of the DPF, wherein the differential pressure sensor is directly mounted in the exhaust pipe that is disposed at the rear end portion of the DPF.

The differential pressure sensor may include: a first pressure valve that is connected with the upstream side of the DPF; and a second pressure valve that is connected with the downstream side of the DPF, wherein the second pressure valve may be mounted in a direction horizontal to the ground in the exhaust pipe, and the first pressure valve may be extended to a lower portion of a vertical direction from the differential pressure sensor.

In a side portion of the exhaust pipe, a valve receiving portion that is extended in a horizontal direction in a pillar shape having an opened inside may be formed, and to insert and mount the second pressure valve into the valve receiver, an internal circumference of the valve receiver may be formed in a shape corresponding to an external circumference of the second pressure valve.

In the second pressure valve, a sealing hole may be formed along an external circumference thereof, and in the sealing hole, a sealing member may be provided to enhance a sealing property between the second pressure valve and the valve receiver.

The sealing member may include an elastic material.

At one surface of the valve receiver, a first hole having a first diameter may be formed to penetrate to the exhaust pipe side, at the other surface of the valve receiver, a second hole having a second diameter may be formed to house the second pressure valve, and the exhaust pipe and the first and second holes may fluidically-communicate with each other.

A first diameter of the first hole may be smaller than a second diameter of the second hole.

The first and second holes may be extended in a direction horizontal to the ground, and a bottom surface of the first hole may have a step at an upper portion further than a bottom surface of the second hole.

In the differential pressure sensor, a sensor element may be provided adjacent to the second pressure valve, and in a state in which the differential pressure sensor is inserted into the valve receiver, the sensor element may communicate with the second hole through a valve passage.

The lowest side end portion of the valve passage may be formed at an upper portion further than the highest side end portion of the first passage to easily discharge condensate water.

As described above, according to a differential pressure sensor and an exhaust system having the same by an exemplary embodiment of the present invention, by directly engaging a differential pressure sensor with an exhaust line of the rear end portion of a DPF, a cost corresponding to a hose and a nipple can be reduced. Further, by removing one of a pair of hoses that may be extended in a vertical direction thereof, the degree of freedom in design increases and a work is more easily performed and thus productivity can be improved. Further, as the differential pressure sensor is directly engaged with the rear end portion of the DPF, the differential pressure sensor can be more stably fixed and a hose of the rear end portion of the DPF is removed and the differential pressure sensor is directly engaged with an exhaust line and thus a pressure of the rear end portion of the DPF can more precisely be detected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
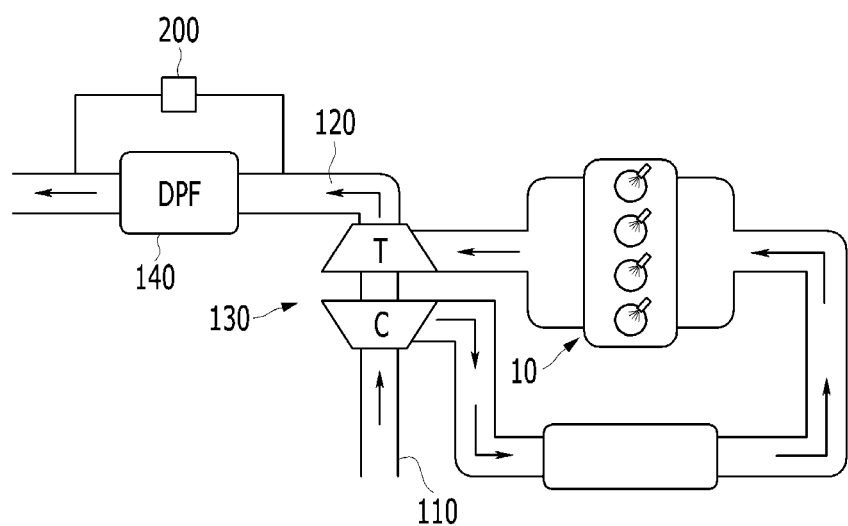
FIG. 1 is a perspective view of an exhaust system having a differential pressure sensor according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which example embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Further, in the drawings, a size and thickness of each element are randomly represented for better understanding and ease of description, and the present invention is not limited thereto, and the thickness of several portions and areas are exaggerated for clarity.

Hereinafter, an engine system according to an exemplary embodiment of the present invention will be described in detail with reference to the attached drawings.

Figure 2:
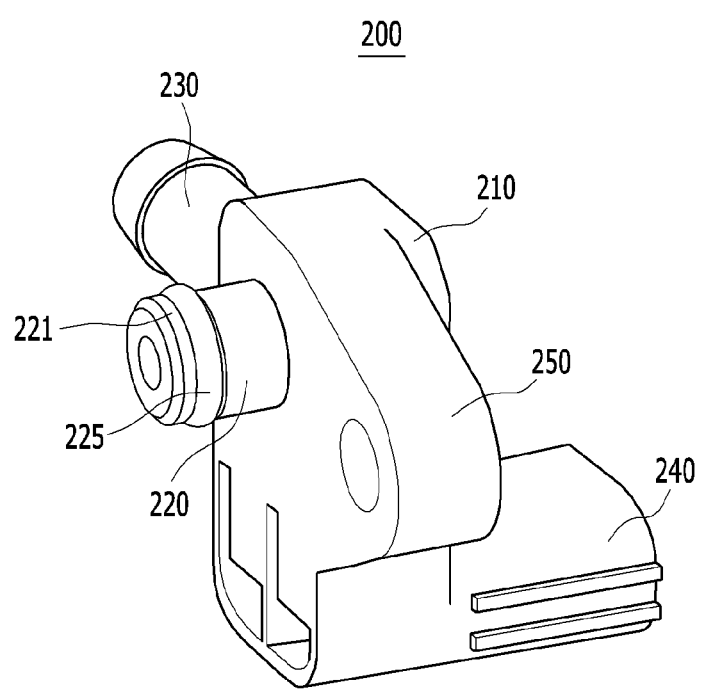
FIG. 2 is a perspective view of a differential pressure sensor according to an exemplary embodiment of the present invention.
Figure 3:
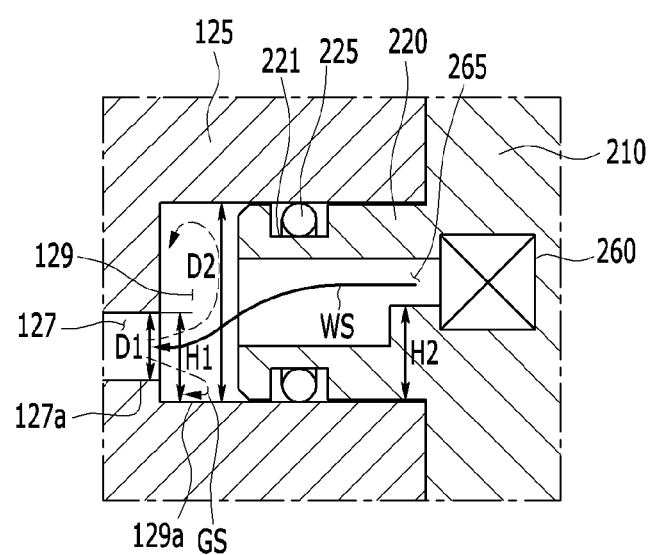
FIG. 3 is a cross-sectional view of an exhaust system having a differential pressure sensor according to an exemplary embodiment of the present invention.
Figure 4:
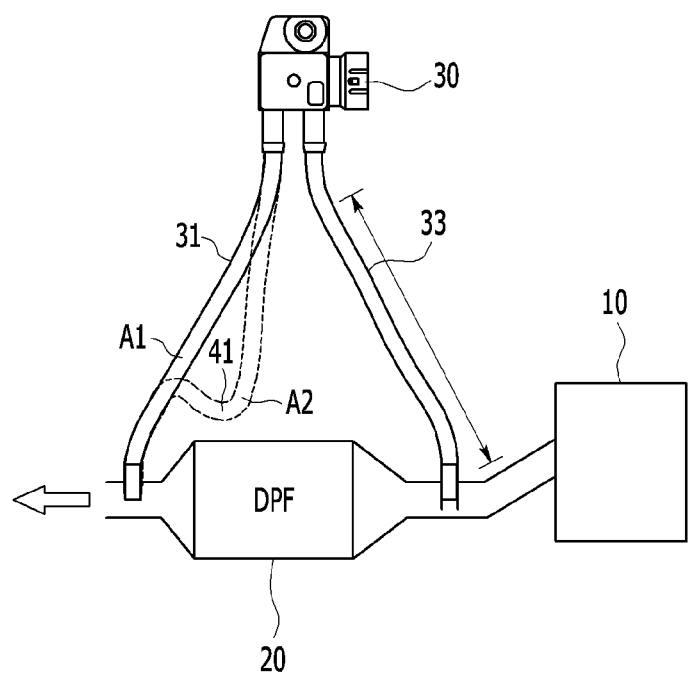
FIG. 4 is a schematic diagram of a conventional differential pressure sensor and an exhaust system to which the differential pressure sensor is applied.

FIG. 1 is a perspective view of an exhaust system having a differential pressure sensor according to an exemplary embodiment of the present invention, FIG. 2 is a perspective view of a differential pressure sensor according to an exemplary embodiment of the present invention, and FIG. 3 is a cross-sectional view of an exhaust system having a differential pressure sensor according to an exemplary embodiment of the present invention.

As shown in FIG. 1, FIG. 2, and FIG. 3, an exhaust system according to an exemplary embodiment of the present invention includes an intake pipe 110 that houses fresh air from the outside to supply the fresh air to a turbocharger 130, an exhaust pipe 120 that injects an EGR gas, having passed through a DPF 140 to upstream of the turbocharger 130, and the turbocharger 130 that doubles a pressure of mixed fresh air and an exhaust gas at a join point of the intake pipe 110 and the exhaust pipe 120.

Further, at the rear end portion (downstream) of the DPF 140, a differential pressure sensor 200 that measures a pressure difference between the front end portion (upstream) and the rear end portion of the DPF 140 is mounted. The differential pressure sensor 200 may be inserted and mounted in a valve receiver 125 that is formed at one side of the exhaust pipe 120. In the valve receiver 125, to measure a rear end portion pressure of the DPF 140, a first hole 127 that fluidically-communicates with the exhaust pipe 120 and a second hole 129 that houses the differential pressure sensor 200 are formed therein (see FIG. 3).

Referring to FIG. 2, the differential pressure sensor 200 includes a sensor housing 210, a first pressure valve 230 that is formed at a side surface of the sensor housing 210 and that is connected with the exhaust pipe 120 that is formed at upstream of the DPF 140 by a hose, and a second pressure valve 220 that is formed at one surface of the sensor housing 210 and that is directly inserted and mounted in the exhaust pipe 120 that is formed at downstream of the DPF 140.

The sensor housing 210 performs a function of protecting a sensor element 260 including a sensor chip that is disposed therein and a sensor cell in which the sensor chip is received.

The first pressure valve 230 is connected with the exhaust pipe 120 of the upstream side of the DPF 140 by a hose to enable the differential pressure sensor 200 to detect a pressure of the upstream side of the DPF 140. When the differential pressure sensor 200 is mounted in the exhaust pipe 120, the first pressure valve 230 is extended to a lower portion of a vertical direction. Therefore, bending can be prevented from occurring in a hose that is mounted in the first pressure valve 230 or condensate water can be prevented from being stagnated within a hose.

The second pressure valve 220 is directly engaged with the exhaust pipe 120 of the downstream side of the DPF 140. Therefore, the differential pressure sensor 200 may detect a pressure of the downstream side of the DPF 140 and determines a difference value between the pressure of the downstream side of the DPF 140 and a pressure of the upstream side of the DPF 140 to transfer the determined difference value to a control device. When a pressure difference between upstream and downstream of the DPF 140 that is measured by the differential pressure sensor 200 is equal to or larger than a predetermined value, the control device may control to reproduce an exhaust filter, and by ejecting fuel to an injector, the control device may burn soot that is collected within the exhaust filter.

According to an exemplary embodiment of the present invention, the second pressure valve 220 is inserted and mounted in the exhaust pipe 120 not to require a separate nipple. Hereinafter, this will be described in more detail with reference to FIG. 3.

The second pressure valve 220 may be formed in a cylindrical shape and protrudes from one surface of the sensor housing 210 toward the valve receiver 125. The second pressure valve 220 may be inserted and mounted in the valve receiver 125 that is formed in the exhaust pipe 120. In this way, by directly connecting the differential pressure sensor 200 with the exhaust pipe 120 through the second pressure valve 220, a hose and nipple for connecting the second pressure valve 220 and the exhaust pipe 120 can be removed. Therefore, a cost can be reduced.

At the outside of a radius of the second pressure valve 220, a sealing hole 221 may be formed, to prevent an exhaust gas or a foreign substance from being leaked to the outside of the second pressure valve 220, a sealing member 225 may be provided in the sealing hole 221. The sealing member 225 may include an elastic material, and when the second pressure valve 220 is coupled to the valve receiver 125, the second pressure valve 220 is pressed to the inside of the radius and thus cohesion of the second pressure valve 220 and the valve receiver 125 may be enhanced with elasticity.

The sensor element 260 is provided within the second pressure valve 220, and a pressure of an exhaust gas within the exhaust pipe 120, having passed through the DPF 140 is measured by the sensor element 260. For this reason, the first and second holes 127 and 129 are formed between the exhaust pipe 120 and the valve receiver 125.

The first hole 127 is formed to penetrate one surface of the valve receiver 125 and the inside of the exhaust pipe 120, and the second hole 129 is formed at the other surface of the valve receiver 125 and houses the second pressure valve 220. The first and second holes 127 and 129 communicate with the sensor element 260 of the differential pressure sensor 200 through a valve passage 265.

The first hole 127 and the second hole 129 have a first diameter D1 and a second diameter D2, respectively, and the first diameter D1 is set smaller than the second diameter D2. Therefore, an inflow amount of an exhaust gas that flows the exhaust pipe 120 can be minimized by the first hole 127 having the first diameter D1.

Further, as shown in FIG. 3, while an exhaust gas, having passed through the first hole 127, which is a narrow space arrives at the second hole 129 having a wide space, space that flows the exhaust gas is rapidly increased. Accordingly, as indicated GS by a dotted line, a movement tumble of an exhaust gas occurs in the second hole 129.

That is, an exhaust gas that is injected in a horizontal direction along a narrow space of the first hole 127 forms and moves a vortex while being injected into the second hole 129 of a wide space. Therefore, even when a foreign substance is injected along the first hole 127, the foreign substance moves in a vertical direction of the second hole 129 by the vortex and thus it is remarkably suppressed to directly transfer the foreign substance to the sensor element 260 within the sensor housing 210 along the valve passage 265. Even when the differential pressure sensor 200 is used for a long time, stability and performance of the sensor element 260 may maintain an expectation level.

In the instant case, the valve receiver 125 is formed horizontally to the ground from a side portion of the exhaust pipe 120, and the second pressure valve 220 that is coupled to the valve receiver 125 is disposed horizontally to the ground. Therefore, an exhaust gas may move while vertically forming a vortex, and a foreign substance drops in a gravity direction to be deposited at a bottom surface 129a of the second hole 129. In a state in which the second pressure valve 220 is horizontally extended to the ground, the first pressure valve 230 is extended to a lower portion of a vertical direction. Therefore, as a hose that is mounted in the first pressure valve 230 naturally advances to a gravity direction, a phenomenon is suppressed that bending occurs in the hose or condensate water is stagnated within the hose.

The bottom surface 127a of the first hole 127 has a height difference upward further than the bottom surface 129a of the second hole 129. Therefore, a vortex more easily occurs in a downward direction of an exhaust gas and a side wall of the bottom surface 129a of the second hole 129 is formed and thus a foreign substance is smoothly collected.

Further, a height H1 from the bottom surface 129a of the second hole 129 to an upper surface of the first hole 127 is set lower than a height H2 from the bottom surface 129a of the second hole 129 to a lower surface of the valve passage 265. Therefore, a foreign substance that is injected into the first hole 127 is prevented from being injected into the valve passage 265. Further, when condensate water occurs by cooling of an exhaust gas of a high temperature, the condensate water may be easily discharged from the valve passage 265 to the first hole 127, as indicated WS by a solid line.

Meanwhile, it is easily known to a person skilled in the art that the structure of the first pressure valve 230 and the structure of the second pressure valve 220 can be changeable to each other.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system having a diesel particulate filter (DPF) installed on an exhaust pipe and a differential pressure sensor that measures a pressure difference between a front end portion and a rear end portion of the DPF,
    wherein the differential pressure sensor includes:
        a first pressure valve connected with an upstream side of the DPF; and
        a second pressure valve connected with a downstream side of the DPF,
    wherein a valve receiver in a pillar shape having an open inside is formed at the exhaust pipe at the downstream side of the DPF, and
    wherein the second pressure valve is inserted and mounted into the valve receiver.

2. The exhaust system of claim 1, wherein an internal circumference of the valve receiver is formed in a shape corresponding to an external circumference of the second pressure valve.

3. The exhaust system of claim 2, wherein the first pressure valve is extended perpendicular to the second pressure valve from the differential pressure sensor.

4. The exhaust system of claim 3, wherein in the second pressure valve, a sealing opening is formed along an external circumference of the second pressure valve, and
    in the sealing opening, a sealing member is provided to enhance a sealing property between the second pressure valve and the valve receiver.

5. The exhaust system of claim 4, wherein the sealing member is made of an elastic material.

6. The exhaust system of claim 3, wherein at one surface of the valve receiver, a first opening having a first diameter is formed to penetrate to interior circumference of the exhaust pipe, at a second surface of the valve receiver, a second opening having a second diameter is formed to house the second pressure valve, and the exhaust pipe and the first and second openings fluidically-communicate with each other.

7. The exhaust system of claim 6, wherein the first diameter of the first opening is smaller than the second diameter of the second opening.

8. The exhaust system of claim 7,
    wherein the first and second openings are extended in an extending direction of the second pressure valve, and
    wherein a bottom surface of the first opening is positioned higher than a bottom surface of the second opening.

9. The exhaust system of claim 6, wherein in the differential pressure sensor, a sensor element is provided adjacent to the second pressure valve, and in a state in which the differential pressure sensor is inserted into the valve receiver, the sensor element communicates with the second opening through a valve passage.

10. The exhaust system of claim 9, wherein the valve passage and the first opening are configured such that condensate water is discharged from the valve passage to the first opening.

11. An exhaust system having a diesel particulate filter (DPF) installed on an exhaust pipe and a differential pressure sensor that measures a pressure difference between a front end portion and a rear end portion of the DPF, and
    wherein the differential pressure sensor includes:
        a first pressure valve that is connected with an upstream side of the DPF; and
        a second pressure valve that is connected with a downstream side of the DPF,
    wherein a valve receiver in a pillar shape having an open inside is formed at the exhaust pipe at the upstream side of the DPF, and
    wherein the first pressure valve is inserted and mounted into the valve receiver, and
    wherein an internal circumference of the valve receiver is formed in a shape corresponding to an external circumference of the first pressure valve.

* * * * *